United States Patent [19]

Tsurunaga et al.

[11] Patent Number: 5,002,110
[45] Date of Patent: Mar. 26, 1991

[54] OFF-ROAD PNEUMATIC TIRE WITH VIBRATION-REDUCING LUGGED TREAD

[75] Inventors: Yasuaki Tsurunaga, Musashimurayama; Satoshi Yoshizaki, Kodaira, both of Japan

[73] Assignee: Bridgestone Corporation, Tokyo, Japan

[21] Appl. No.: 401,567

[22] Filed: Aug. 29, 1989

Related U.S. Application Data

[63] Continuation of Ser. No. 72,711, Jul. 13, 1987, abandoned.

[30] Foreign Application Priority Data

Jul. 15, 1986 [JP] Japan .................................. 61-167275

[51] Int. Cl.$^5$ ...................... B60C 11/04; B60C 11/00; B60C 11/03
[52] U.S. Cl. .............................. 152/209 B; 152/209 R
[58] Field of Search ........................ 152/209 B, 209 R

[56] References Cited

U.S. PATENT DOCUMENTS

| | | | |
|---|---|---|---|
| 3,786,848 | 1/1974 | Brown et al. | 152/209 R |
| 4,254,811 | 3/1981 | Devaux | 152/209 D |
| 4,289,183 | 9/1981 | Abe et al. | 152/209 B |
| 4,412,575 | 11/1983 | Maeda et al. | 152/209 R |
| 4,445,561 | 5/1984 | Kono et al. | 152/209 B |
| 4,664,167 | 5/1987 | Kawakami et al. | 152/209 R |

FOREIGN PATENT DOCUMENTS

| | | | |
|---|---|---|---|
| 56-25004 | 3/1981 | Japan | 152/209 B |
| 62-157811 | 7/1987 | Japan | 152/209 B |
| 2042992 | 10/1980 | United Kingdom | 152/209 R |

*Primary Examiner*—Michael W. Ball
*Assistant Examiner*—Adrienne C. Johnstone
*Attorney, Agent, or Firm*—Cushman, Darby & Cushman

[57] ABSTRACT

A pneumatic tire comprising a tread formed with a plurality of laterally extending groove portions and land portions which are alternatively arranged with a substantially constant pitch in a circumferential direction of the tire, wherein a land portion ratio of a total length of the land portion on a cross line, which is substantially perpendicular to the circumferential direction, to a width of the tread, varies along the cricumferential direction, has not less than two maximum values per the constant pitch and has minimum values, the maximum values each having almost the same values, and the minimum values being not less than 55 percent of the maximum values.

1 Claim, 5 Drawing Sheets

OFF-ROAD PNEUMATIC TIRE WITH VIBRATION-REDUCING LUGGED TREAD

This is a continuation of application No. 07/072,711, filed July 13, 1987, which was abandoned upon the filing hereof.

FIELD OF THE INVENTION

The present invention relates in general to an off-road pneumatic tire operated on an uneven roadway and a relatively even roadway, and in particular to an off-road pneumatic tire which includes regular tread grooves having a depth of between 6 percent and 8 percent of the tire section height and deep tread grooves having a depth of between 9 percent and 14 percent of the tire section height in accordance with JATMA standard.

DESCRIPTION OF THE PRIOR ART

Referring to FIGS. 8 and 10, there are shown conventional tires, designated generally by reference numerals 1 and 3, which include treads 2 and 4, respectively, with tread patterns as shown. The tread 2 of the tire 1 is formed with a plurality of laterally extending groove portions 6 and land portions 7 which are alternatively arranged with a substantially constant pitch $P_1$ in the circumferential direction of the tire 1. Likewise, the tread 4 of the tire 3 is formed with a plurality of laterally extending groove portions 8 and land portions 9 which are alternatively arranged with a substantially constant pitch $P_2$ in the circumferential direction of the tire 3. The tread 2 shown in FIG. 8 is designed so that it provides better wear resistance performance and better cut resistance performance, while the tread 4 shown in FIG. 10 is designed so that it provides better traction performance when the tire is driven, rather than wear resistance performance and cut resistance performance. For this particular purpose, the tread groove and land portions 8 and 9 laterally extend continuously from one tread edge to the other. Conventionally, as tires for off-road vehicles are generally operated on uneven roadway, vibration and a comfortable ride performance of the vehicles were not important. However, in recent years, as vehicles such as a wheel loader and the like have been more frequently driven on a relatively even roadway, the vibration and comfortable ride performance of off-road tires for vehicles such as a wheel loader and the like became very important. Particularly, in the tire having the tread pattern as shown in FIG. 10, as the groove portions 8 and the land portions 9 both extend substantially laterally from one tread edge to the other and are alternatively arranged in the circumferential direction of the tire, there is the disadvantage that the vibration of the tire is considerably large.

SUMMARY OF THE INVENTION

It is, accordingly, an important object of the present invention to provide an improved off-road pneumatic tire which can alleviate an occurrence of vibration even when it is operated on a relatively even roadway.

In accordance with one important aspect of the present invention, there is provided a pneumatic tire comprising a tread formed with a plurality of laterally extending groove portions and land portions which are alternatively arranged with a substantially constant pitch in a circumferential direction of the tire, wherein a land portion ratio of a total length of the land portion on a cross line, which is substantially perpendicular to the circumferential direction, to a width of the tread, varies along the circumferential direction, has not less than two maximum values per the constant pitch and has minimum values, the maximum values each having almost the same values, and the minimum values being not less than 55 percent of the maximum values.

In order to analyze a mechanism causing an annoying thump or vibration in a pneumatic tire, the inventors have made various investigations and experiments with respect to an arrangement of tread groove portions and tread land portions and these forms, a relationship between an arrangement of groove portions and land portions and a repeated pitch, and a relationship between an area of the tread in contact with the ground and a reacting force from the ground and these variations on the circumference of the tire (for example, RFV, that is, Radial Force Variation).

First, as shown in FIG. 10, the ratio of a total length $W_{71} + W_{72}$ of the land portion 9 on a cross line designated A perpendicular to the mid-circumferential line of the tire to a full tread width $W_4$ (hereinafter referred as a "land portion ratio M") is investigated along the circumference of the tire as shown in FIG. 11. More specifically, the relationship between the vibration of the tire, and the ratio of a minimum value $M_2$ of the land portion ratio M to a maximum value $M_1$ of the land portion ratio M per one pitch $P_2$ is investigated. It is noted that the land portion ratio of 100 percent means that a land portion extends continuously from one tread edge to the other on the cross line corresponding to the 100 percent land portion ratio, while 0 percent means that only a groove portion is formed on the cross line corresponding to the 0 percent. In the case of the tread 4, the maximum value $M_1$ of the land portion ratio M is 100 percent and forms a peak value at one position per one pitch $P_2$, the minimum value $M_2$ of the land portion ratio M is 31 percent, and the ratio $M_2/M_1$ is 31 percent. Generally, in the case of the tread pattern as shown in FIG. 10, the ratio $M_2/M_1$ is from 25 percent to 35 percent and the vibration is also large. In the case of the tread 2 shown in FIG. 8, the maximum values $M_1$ of the land portion ratio M form peak values at two positions per one pitch $P_1$ and are approximately 100 percent and 65 percent, the minimum value $M_2$ of the land portion ratio M is approximately 54 percent, the ratio $M_2/M_1$ to the larger maximum value of the two is approximately 54 percent, the difference between the two maximum values is as much as 35 percent, and the vibration is also large. Furthermore, the reacting force from the ground during rotation of the tire is converted into an RFV (Radial Force Variation), this variation is further analyzed in accordance with a so-called Furies analysis, and then the vibration is analyzed. As a result, the closer to a value of 1 the ratio $M_2/M_1$, the smaller the variation in the reacting force from the ground, and the vibration is found to be reduced. In addition, it is found that the peak position of the maximum value $M_1$ per one pitch is desirable to be not less than two, and that the closer the maximum values, the smaller the vibration.

The inventors further have made various investigations and found the following facts.

That is, a pneumatic tire according to the present invention comprises a tread formed with a plurality of laterally extending groove portions and land portions which are alternatively arranged with a substantially constant pitch in a circumferential direction of the tire, wherein a land portion ratio of a total length of the land portion on a cross line, which is substantially perpendicular to the circumferential direction, to a width of the tread, varies along the circumferential direction, has not less than two maximum values per the constant pitch and has minimum values, the maximum values having almost the same values, and the minimum values being not less than 55 percent of the maximum values.

The reason why the land portion ratio has not less than two maximum values per the constant pitch is that, in the case of less than two, the effect of the present invention cannot be obtained. In addition, the reason why the minimum values are not less than 55 percent of the maximum values is that, in the case of less than 55 percent, the difference between the maximum and minimum values becomes excessively large, the variation in the reacting force from the ground becomes large, and as a consequence the vibration of the tire cannot be effectively reduced.

BRIEF DESCRIPTION OF THE DRAWINGS

The drawbacks of a prior-art off-road pneumatic tire and the features and advantages of an off-road pneumatic tire according to the present invention will be more clearly understood from the following description taken in conjunction with the accompanying drawings in which.

DESCRIPTION OF THE PREFERRED EMBODIMENTS

Figure 1:
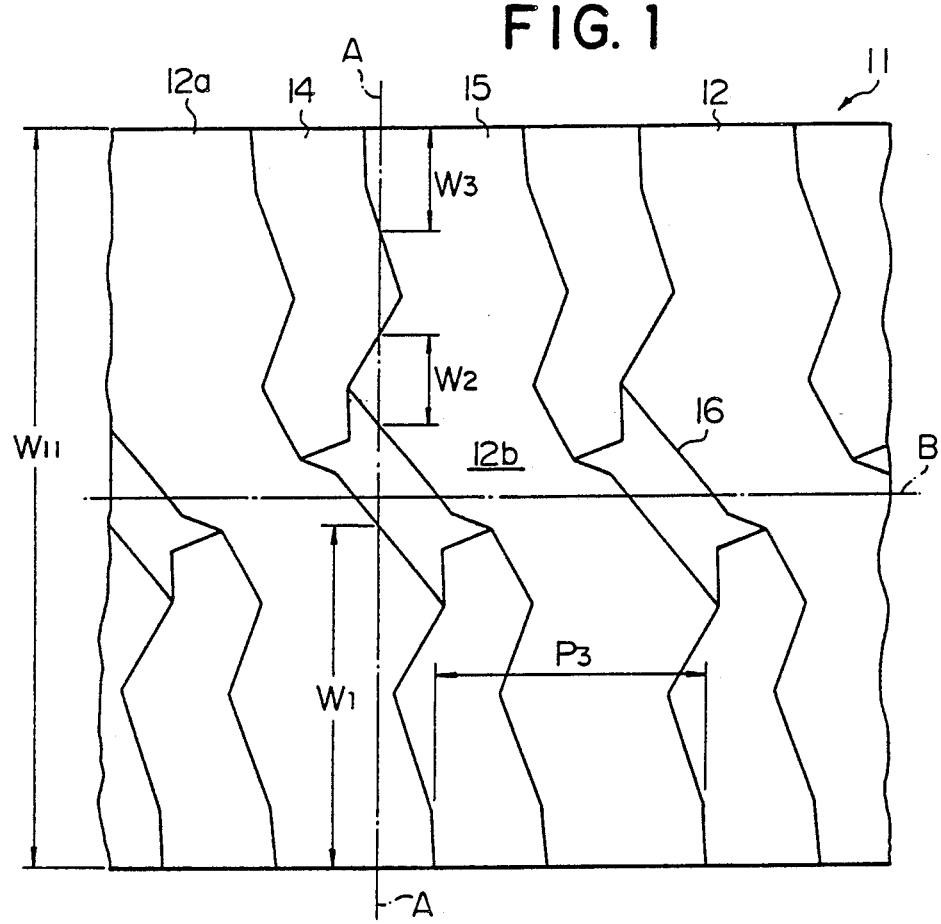
FIG. 1 is a partial top view of a tread of one embodiment of the tire according to the present invention.
Figure 2:
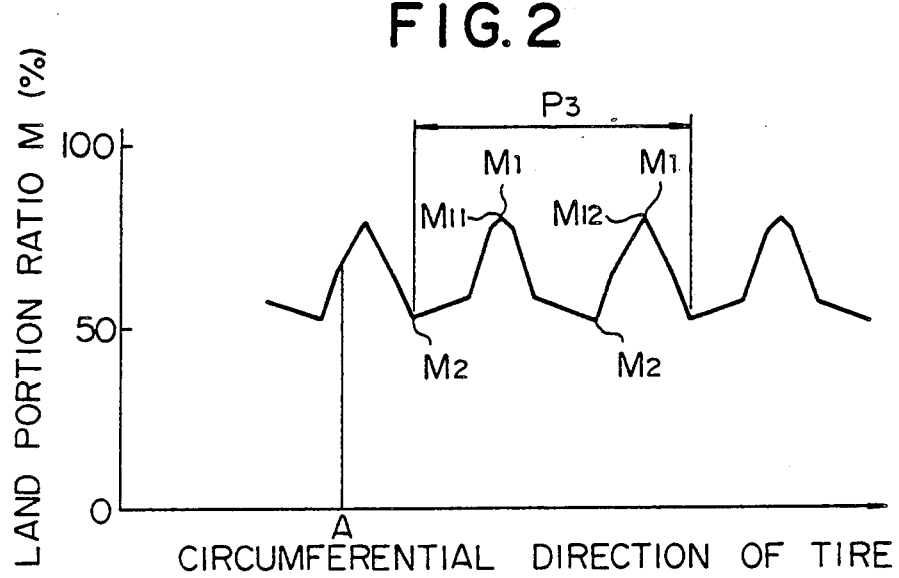
FIG. 2 shows a variation in a land portion ratio of the tread shown in FIG. 1.

Referring to FIG. 1 of the drawings, an off-road pneumatic tire constructed in accordance with a first embodiment of the present invention is generally designated by reference numeral 11. The pneumatic tire 11 has a tire size designation 26.5-25 and comprises a tread 12 formed at its tread surface portion 12a with a plurality of laterally extending groove portions 14 and land portions 15 which are alternatively arranged with a substantially constant pitch $P_3$ in the circumferential direction of the tire 11. A plurality of platforms 16 are provided in the mid-circumferential portion of the tread 12 and also arranged with the constant pitch $P_3$ in the circumferential direction of the tire 11. Each platform 16 is constituted by a shallow groove shallower than each of the groove portions 14 and extends diagonally with respect to a mid-circumferential line B of the tire so that it is connected at one end thereof with the groove portion 14 on the one side of the tread 12 and at the other end thereof with the groove portion 14 on the other side. The tread 12 has a full tread width $W_{11}$, and one of the land portions 15 has, for example, a total length $W_{15}$ of a length $W_1$, a length $W_2$ and a length $W_3$ on a cross line A perpendicular to the mid-circumferential line B as shown in FIG. 1. The aforementioned land portion ratio M ($W_{15}/W_{11} \times 100$ percent) of the total length $W_{15}$ of the tread portion 15 on the cross line A to the full tread width $W_{11}$, as shown in FIG. 2, varies on the circumference of the tire and has maximum values $M_1$ and minimum values $M_2$. The land portion ratio M has two maximum values $M_{11}$ and $M_{12}$ per one pitch $P_3$, and these maximum values are both approximately 80 percent and have the same values. It is preferable that the difference between the maximum values of the land portion ratio M be within 20 percent of the larger maximum value. Each of the minimum values $M_2$ is approximately 54 percent, and 67.5 percent of each of the maximum values $M_{11}$ and $M_{12}$ (approximately 80 percent). The constructions other than just stated above are substantially identical to those of a known off-road pneumatic tire, and therefore the description will hereinafter be omitted.

The operation of the off-road pneumatic tire constructed in accordance with the first embodiment of the present invention will hereinafter be described.

In the land portion ratio M of the tire according to the first embodiment of the present invention, as the minimum value $M_2$ (54 percent) is 67.5 percent of each of the maximum values $M_{11}$ and $M_{12}$ (approximately 80 percent), a variation in the ratio of the land portion 15 on the cross line A is small along the circumferential direction of the tire, and accordingly the area of the land portion 15 on the cross line A slightly varies along the circumferential direction of the tire. In addition, as the land portion ratio M has two maximum values $M_{11}$ and $M_{12}$ per one pitch $P_3$ and these maximum values are both approximately 80 percent and have the same values, the variation in the ratio of the land portions 15 on the cross line A is also small even with respect to one pitch $P_3$, and is substantially identical to that of a tread pattern having two times pitch. Thus, the ratio of the land portion 15 on the cross line A slightly varies even on one pitch and also on the circumference of the tire, and this means that a variation in an area of the tread in contact with the ground when the tire is running under load is small and therefore a variation in the reacting force from the ground is small. This results in reduction in vibration of the tire when the tire is running.

Figure 3:
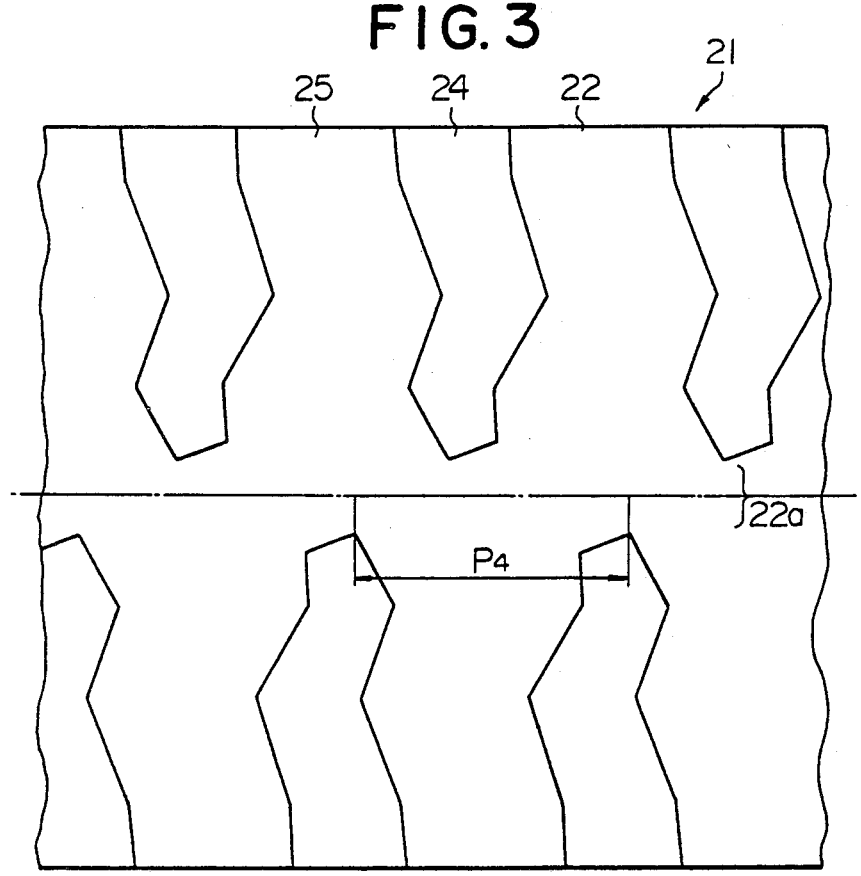
FIG. 3 is a partial top view of a tread of another embodiment of the tire according to the present invention.
Figure 4:
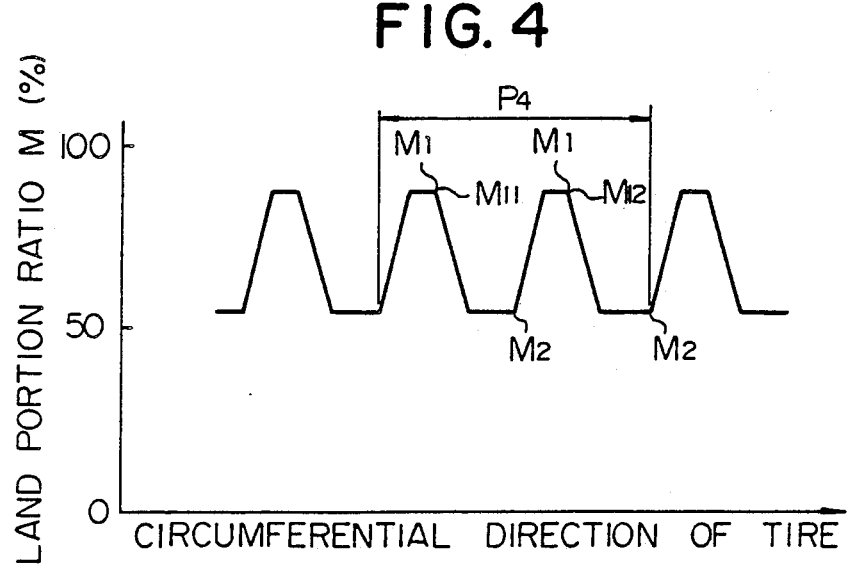
FIG. 4 shows a variation in a land portion ratio of the tread shown in FIG. 3.

Referring to FIGS. 3 and 4, an off-road pneumatic tire constructed in accordance with a second embodiment of the present invention is generally designated by reference numeral 21. The pneumatic tire 21 has a tire size of 23.5-25 and comprises a tread 22 formed with a plurality of laterally extending groove portions 24 and land portions 25 which are alternatively arranged with a substantially constant pitch $P_4$ in the circumferential direction of the tire. Each of the groove portions 24 extends from one of the tread edges and terminates short of a mid-circumferential portion 22a. That is, in the second embodiment, grooves are not formed in the mid-circumferential portion 22a of the tire. The land portion ratio M of this embodiment also has two maximum values $M_{11}$ and $M_{12}$ per one pitch $P_3$, and these maximum values have almost the same values as shown in FIG. 4. The minimum value $M_2$ of the land portion ratio M is approximately 63 percent of each of the maximum values $M_{11}$ and $M_{12}$. Other portions are substantially identical in construction to those of the first embodiment shown in FIG. 1, and therefore the description will hereinafter be omitted.

Figure 5:
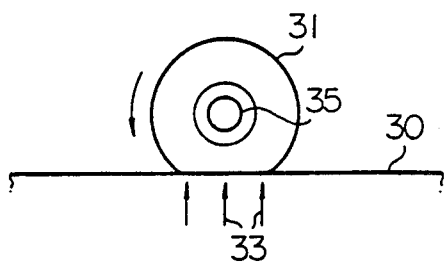
FIG. 5 is a schematic view showing a manner in which RFV (radial force variation) is measured.
Figure 6:
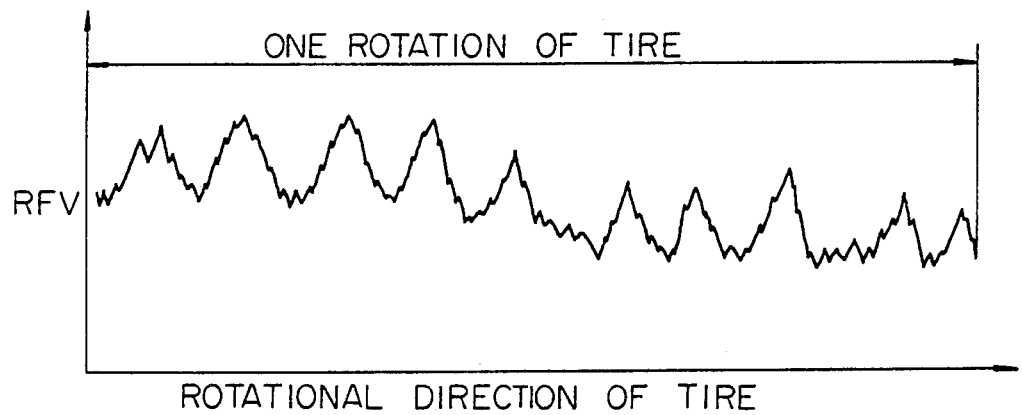
FIG. 6 shows values of the RFV measured in the manner shown in FIG. 5.
Figure 7:
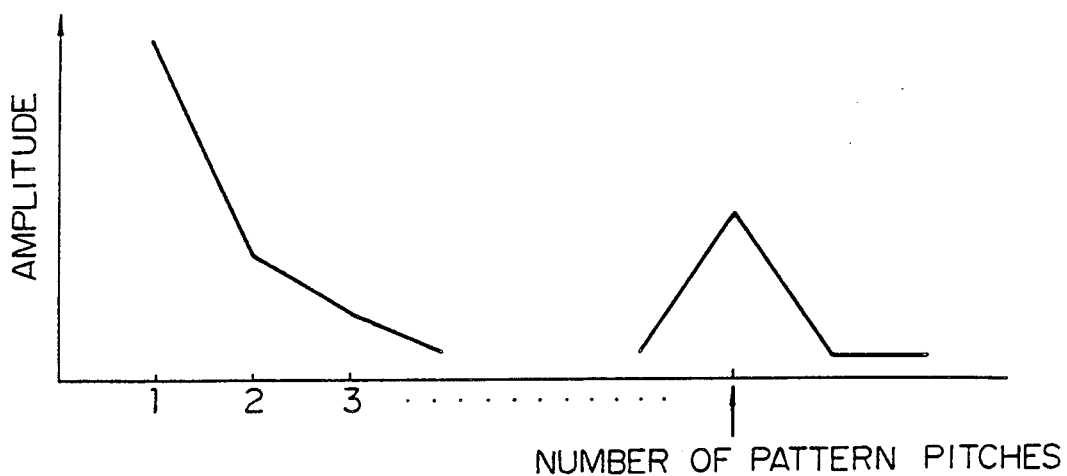
FIG. 7 shows the result of Furies analysis of the values of the RFV shown in FIG. 6.

First and second experimental tires and first and second comparative tires were prepared and tested to confirm the effect of the present invention. The test tires were built and shaped in the same manner except for the tread. The first experimental tire is substantially identical to the tire according to the first embodiment shown in FIG. 1, the second experimental tire is substantially identical to the tire according to the second embodiment shown in FIG. 3, the first comparative tire is substantially identical to the conventional tire shown in FIG. 10, and the second comparative tire is substantially identical to the conventional tire shown in FIG. 8. The test was made with respect to the aforementioned RFV (Radial Force Variation) causing a tire vibration, and the RFV is analyzed by Furies analysis. As shown in FIG. 5, as a test tire 31 rotates through one revolution under a predetermined load, reacting forces 33 come from the ground 30, that is, the RFV is measured at a rotational shaft 35 by a suitable machine for RFV measurement. The result is shown in FIG. 6. The values of the RFV shown in FIG. 6 are analyzed by Furies analysis, and then desirable pattern pitches between groove and land portions are obtained as shown in FIG. 7. The test tires were compared by the magnitude of the amplitude of the pattern pitches, and the test values for the comparative tires were normalized to a value of 100 for comparison purposes. The test values for the experimental tires were compared to the values of the comparative tires and reported relative to the normalized value of 100 as shown in the following Table.

TABLE

Figure 8:
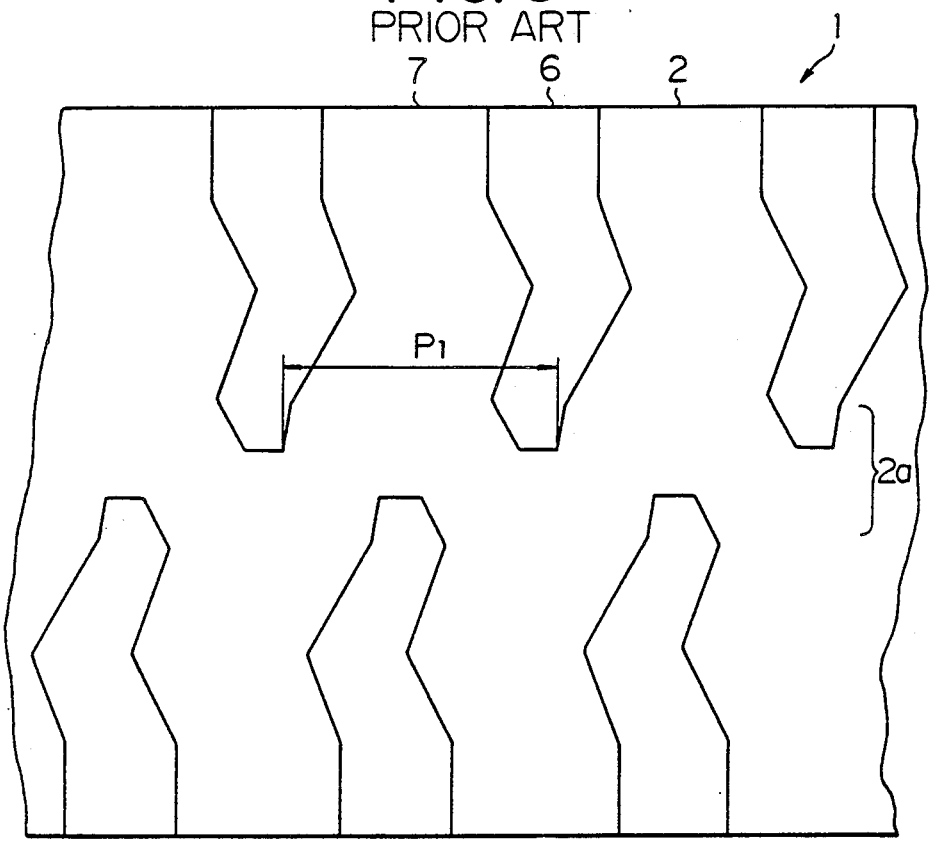
FIG. 8 is a partial top view of a tread of a conventional tire.
Figure 9:
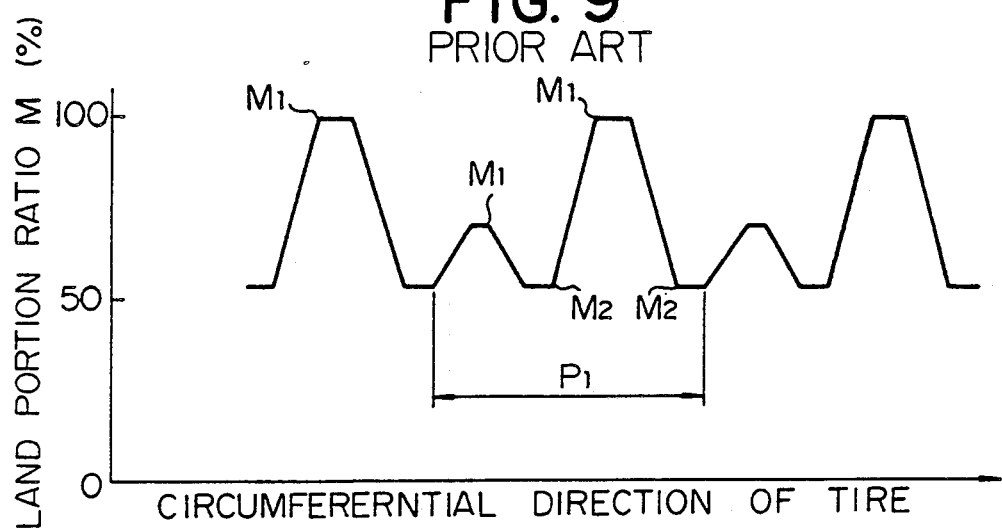
FIG. 9 shows a variation in a land portion ratio of the tread shown in FIG. 8.
Figure 10:
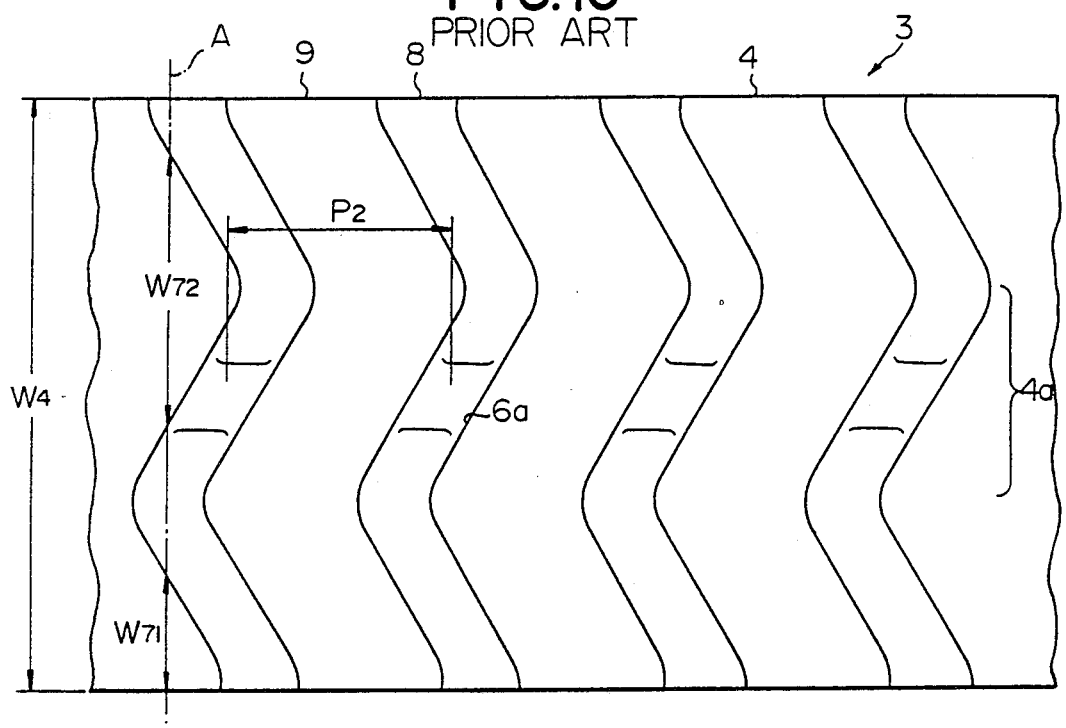
FIG. 10 is a partial top view of a tread of a conventional tire.
Figure 11:
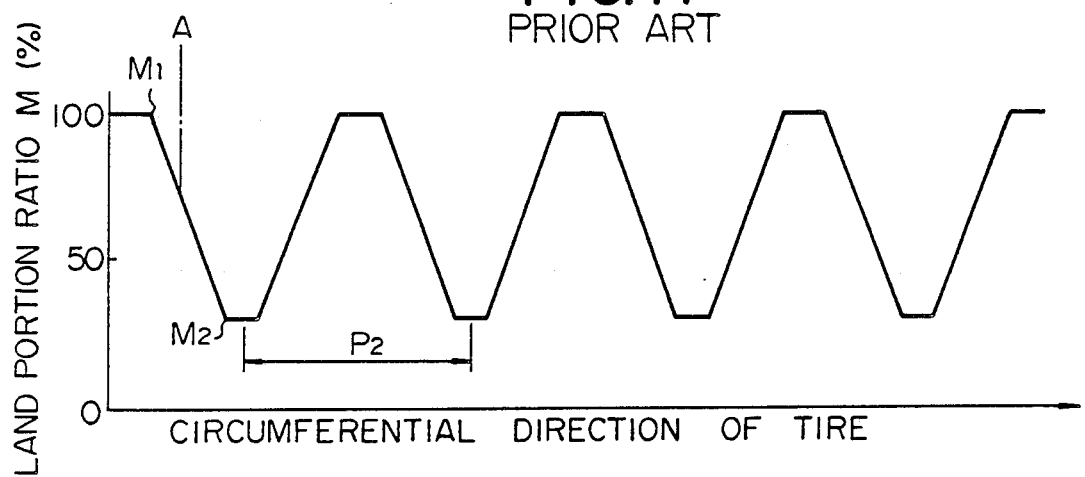
FIG. 11 shows a variation in a land portion ratio of the tread shown in FIG. 10.

| | First experimental tire shown in FIG. 1 | First comparative tire shown in FIG. 10 | Second experimental tire shown in FIG. 3 | Second comparative tire shown in FIG. 8 |
| --- | --- | --- | --- | --- |
| Existence of groove portion in tread central portion | Yes | Yes | No | No |
| Value of RFV | 80 | 100 | 50 | 100 |

As shown in Table, the values of the RFV of the first and second experimental tires are considerably reduced as compared with those of the first and second comparative tires. That is, the value of the RFV of the first experimental tire is one-fifth of that of the RFV of the first comparative tire, while the value of the RFV of the second experimental tire is a half of that of the RFV of the second comparative tire. As a result, the vibration of the tire is remarkably reduced at the rate of $\frac{1}{2}$ or 1/5.

From the foregoing description, it will be seen that, in accordance with the present invention, there is provided an improved off-road pneumatic tire which can alleviate an occurrence of vibration when it is running on an uneven roadway or on a relatively even roadway.

While certain representative embodiments and details have been shown for the purpose of illustrating the invention, it will be apparent to those skilled in this art that various changes and modifications may be made therein without departing from the spirit or scope of the invention.

What we claim is:

1. A pneumatic tire comprising a tread formed with a plurality of laterally extending groove portions and land portions which are alternately arranged with a substantially constant pitch in a circumferential direction of said tire, said tread having a cross line which is substantially perpendicular to said circumferential direction, and a plurality of land portion ratios each of which is defined as a ratio of a total length of said land portion on said cross line to a full width of said tread, the full width being defined as a length as measured along said cross line from one lateral edge of said tread to the other lateral edge, the length of said land portion on said cross line including the length of a marginal edge of said groove portion on said cross line;

said land portion ratio varying along said circumferential direction and having local maximum values and local minimum values;

said local maximum values of said land portion ratios occurring at not less then two places per said constant pitch and having substantially the same values and having a lower limit of approximately 80 percent and an upper limit of 88 percent; and said local minimum values through each pitch of said land portion ratios being not less than 55 percent of said local maximum values of said land portion ratios and having substantially the same values.

* * * * *